United States Patent [19]
Glenn, Jr. et al.

[11] Patent Number: 5,640,606
[45] Date of Patent: Jun. 17, 1997

[54] MULTIFUNCTION DISK CHASSIS HAVING AUDIO/VIDEO BUSES FOR EXCLUSIVELY TRANSMITTING AUDIO/VIDEO MATERIAL AND PLURALITY OF EDGE CONNECTOR PAIRS FOR CONNECTING WITH PLURALITY OF HARD DISK DRIVES

[75] Inventors: Robert Samuel Glenn, Jr.; David Lawrence Rossmere, both of San Jose; Alfred Abraham Goldspiel, Watsonville, all of Calif.

[73] Assignees: Sony Corporation, Japan; Sony Electronics Inc., N.J.

[21] Appl. No.: 389,198

[22] Filed: Feb. 15, 1995

[51] Int. Cl.⁶ .......................... G06F 13/12; G06F 13/20
[52] U.S. Cl. ...................... 395/882; 395/857; 395/282
[58] Field of Search ....................... 361/413, 788; 364/200; 340/825.24; 358/181; 395/308, 882, 857, 282; 370/85; 235/462; 439/352

[56] References Cited

U.S. PATENT DOCUMENTS

| | | | |
|---|---|---|---|
| 4,535,448 | 8/1985 | Baxter et al. | 370/85 |
| 5,347,113 | 9/1994 | Reddersen et al. | 235/462 |
| 5,488,541 | 1/1996 | Mistry et al. | 361/788 |
| 5,495,584 | 2/1996 | Holman, Jr. et al. | 395/308 |
| 5,518,416 | 5/1996 | Kantner et al. | 439/352 |

*Primary Examiner*—Thomas C. Lee
*Assistant Examiner*—David Ton
*Attorney, Agent, or Firm*—Ronald P. Kananen

[57] ABSTRACT

A dual bus, multi-function disk chassis is provided for use as an enclosure for hard disk drives that store audio or video. The chassis allows configuration of the disk drives for either one of two independent buses contained within the chassis without the need to re-cable any of the bus connections. These two buses are an audio bus for transmitting audio material and a video bus for transmitting video material. The chassis also contains multiple sets of edge connector pairs. Each of the edge connector pairs consists of a first edge connector for connection to the video bus and a second edge connector for connection to the audio bus. This arrangement allows the disk drives to be configured for audio or video storage depending on the orientation of the drive at insertion.

8 Claims, 2 Drawing Sheets

FIG. 2

MULTIFUNCTION DISK CHASSIS HAVING AUDIO/VIDEO BUSES FOR EXCLUSIVELY TRANSMITTING AUDIO/VIDEO MATERIAL AND PLURALITY OF EDGE CONNECTOR PAIRS FOR CONNECTING WITH PLURALITY OF HARD DISK DRIVES

BACKGROUND OF THE INVENTION

1. Field of the Invention

The present invention relates to a disk chassis and more specifically to a dual bus, multifunction SCSI disk chassis which allows quick configuration of a mass storage device, such as a disk drive, for either one of two SCSI buses without needing to rewire any bus connections.

2. Description of the Prior Art

In today's post-production video editing industry, the use of multiple hard drives for digitally storing non-linear video and audio enclosed within a disk chassis is becoming increasingly more common. For a number of reasons, the disk chassis must be configured according to the needs of the end user. Scheduling changes within a post production facility often require the removal and replacement of hard drives to different interfaces within the same disk chassis or to different systems. Also, the ability to re-use a drive for either audio or video storage based on the project requirements is very advantageous and cost-effective. Most importantly, different projects require different numbers of audio and video drives, respectively. For all of these reasons, a disk chassis which can be easily configured to the end user's needs is desired.

FIG. 1 shows a chassis configuration 11 of the type which is presently used in prior art disk chassis arrangements. This configuration uses two daisy chained SCSI cables to carry audio and video data. Both a SCSI (Small Computer System Interface) audio bus 12 as well as a SCSI video bus 13 are shown. A plurality of connectors 14 for interfacing hard drives with either bus are provided on each daisy chained SCSI cable. Each edge must be wired for either audio or video connection (indicated by dotted lines in FIG. 1) depending on the user's needs. Another common chassis configuration has only one SCSI bus with a backplane.

SUMMARY OF THE INVENTION

It is an object of the present invention to provide a disk chassis containing a dual bus cable interface which allows a quick configuration of a hard disk drive for connection to either one of the two buses without a need to rewire any bus connections.

It is a further object of the present invention to provide a system which allows disk drives to be easily transported between independent systems depending on a user's scheduling requirements.

Another object of the present invention is to provide a disk chassis which can accommodate a wide variety of hard disk drives in a 3.5" form factor.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects and in accordance with the purpose of the present invention, as embodied and broadly described herein, the disk chassis for use as an enclosure for hard disk drives that store audio or video of this invention may comprise an audio bus for exclusively transmitting audio material and a video bus for exclusively transmitting video material. The chassis also contains multiple sets of edge connector pairs. Each of the edge connector pairs consists of a first edge connector for connection to the video bus and a second edge connector for connection to the audio bus. Preferably, the audio and video buses are independent high speed SCSI (Small Computer System Interface) buses.

Thus, the disk chassis of the present invention allows a quick configuration of a hard disk drive for either one of the two SCSI buses without the need to recable any of the bus connections.

Further, the present invention provides a system wherein these disk drives may easily be transported between independent systems depending on the users scheduling requirements.

In addition, the present invention provides a disk chassis which can accommodate a wide variety of hard disk drives in a 3.5" form factor, including single-ended and differential disk drives. Further, the assembly of the chassis provides flexibility to adapt future hard disk drives, or other mass storage devices such as magneto-optical drives or floppy disk drives.

BRIEF DESCRIPTION OF THE DRAWINGS

The present invention will become more clearly appreciated as the disclosure of the present invention is made with reference to the accompanying drawings wherein.

DETAILED DESCRIPTION OF THE INVENTION

Reference will now be made in detail to the preferred embodiments of the invention, examples of which are illustrated in the accompanying drawings.

Figure 1:
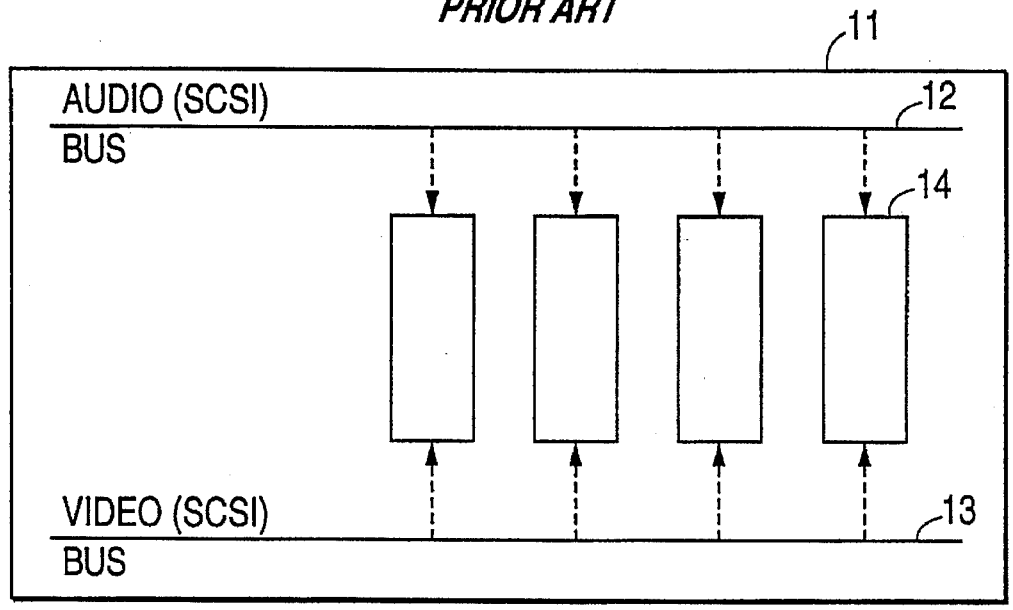
FIG. 1 is a view of a prior art embodiment of the chassis-backplane arrangement discussed in the opening paragraphs of this disclosure.
Figure 2:
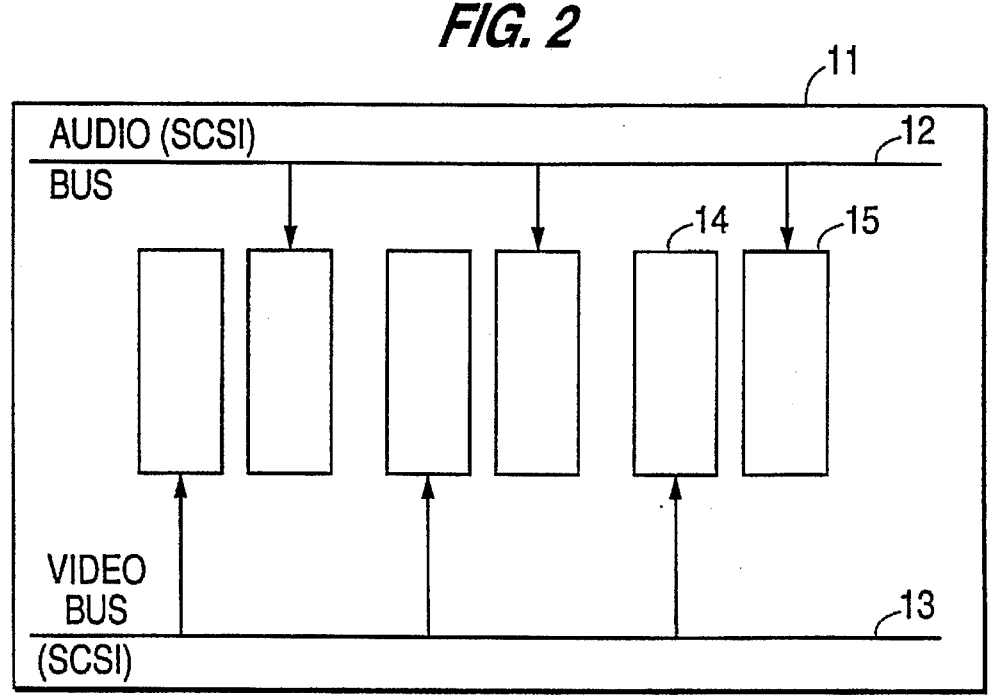
FIG. 2 is view of the chassis backplane arrangement of the present invention.
Figure 3:
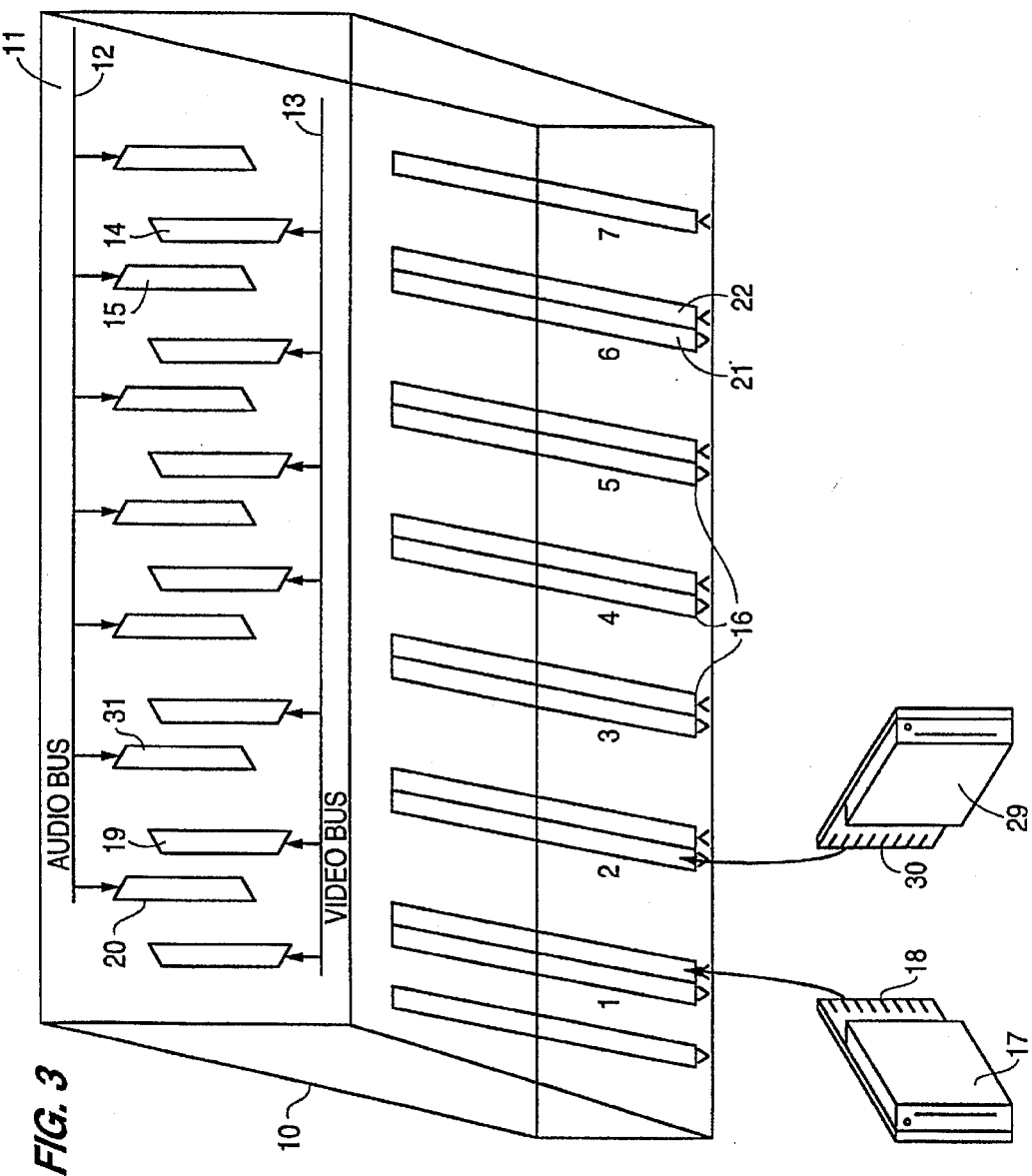
FIG. 3 is an expanded view of the disk chassis of the;present invention.

FIG. 2 shows details of the backplane arrangement of the present invention (located within a disk chassis as can be seen in FIG. 3). To the extent that FIG. 2 has some of the same elements as FIG. 1, like reference numerals are used. The arrangement of FIG. 2 shows an audio bus 12 for exclusively transmitting audio data and a video bus 13 for exclusively transmitting video data. Located between the two buses are a plurality of edge connector pairs (such as pair 14 and 15). Each of the edge connector pairs consists of a first edge connector 14 for connection exclusively to the video bus 13 and a second edge connector 15 for connection exclusively to the audio bus 12, when a disk drive is inserted in either of the edge connectors.

Preferably, the audio and video buses are independent high speed SCSI (Small Computer System Interface) buses. SCSI is a popular parallel interface standard for connecting disk drives and other high performance peripherals to microcomputers. Although FIG. 2 representatively shows three edge connector pairs, more can be added. A preferred embodiment of this invention includes seven edge connector pairs, in an opposing card guide system as seen in FIG. 3.

FIG. 3 demonstrates how the arrangement of this invention allows an end user quickly and easily to configure the system to particular needs. A hard disk drive 17 and 29, or other mass storage device such as a magneto-optical drive or a floppy disk drive, may be connected to either the audio or video bus by its own configuration when inserted into the chassis 10. The disk drive 17 may be arranged in a conventional configuration as mounted asymmetrically on a printed circuit board 18. The circuit board forms a mating end which will connect with an edge connector such as 19 or 20 when a drive is inserted into the chassis. As indicated in FIG. 3, the edge connectors are offset on the back plane 11 to ensure proper mating of a drive with the correct bus. Also, a corresponding offset is provided on the printed circuit board, on which a drive is mounted, to further ensure a proper mating. The base of the chassis contains a plurality of tracks 16, each of which is aligned with a respective edge connector pair 14, 15 or 19, 20, for example. Each of the tracks 16 which are aligned with an edge connector pair is arranged in a dual-track structure where one side of the track (21, for example) directs an inserted drive to a firm connection with an audio bus connected edge connector (15, for example) and the other track (22, for example) in the dual-track structure leads the inserted drive to a firm connection with a video bus connected edge connector (14, for example). If the disk drive (17, for example) is to be used for video material, it is configured (rotated) so that its mating end 18 will connect with an edge connector such as 19. If the disk drive is to be used for audio material (29, for example), it is configured (rotated) so that its mating end 30 will connect with edge connector such as 31. Thus, the disk chassis allows a quick configuration by mere rotation of a hard disk drive for connection with either one of the two SCSI buses without the need to rewire any of the bus connections. Thus the same drive may be used for either audio or video storage depending on its configuration when inserted. The foregoing description of a preferred embodiment of the invention has been presented for purposes of illustration and description. It is not intended to be exhaustive or to limit the invention to the precise form disclosed, and many modifications and variations are possible in light of the above teaching. For example, the disk chassis arrangement could also be used for any other system that would require the end user to quickly reconfigure disk drives for operation on one of two independent buses. Such systems include RAID (Redundant Array of Inexpensive Disks) backup arrangements and semi-redundant file servers. The arrangement of the present invention could also be modified to allow 5¼" drive assemblies to be used within the same chassis. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A multifunction disk chassis for connecting with a plurality of hard disk drives comprising:

an audio bus for exclusively transmitting audio material;

a video bus for exclusively transmitting video material; and a plurality of edge connector pairs for connecting to said buses;

wherein each edge connector pair consists of a first edge connector connected to only said video bus and a second edge connector connected to only said audio bus; and wherein each of said hard disk drives is connected to the first or second edge connector of an connector pair depending on an orientation of the drive at insertion.

2. The multifunction disk chassis as set forth in claim 1, wherein said audio and video buses are independent high speed SCSI interfaces.

3. A method of connecting a plurality of hard disk drives to a multifunction disk chassis comprising the steps of:

providing an audio bus for exclusively transmitting audio material;

providing a video bus for exclusively transmitting video material;

providing a plurality of edge connector pairs wherein each edge connector pair consists of a first edge connector connected to only said video bus and a second edge connector connected to only said audio bus; and connecting each of said hard disk drives to the first or second edge connectors of an edge connector pair depending on the orientation of the drive at insertion.

4. The method of connecting a plurality of hard disk drives to a multifunction disk chassis as set forth in claim 3, wherein said audio and video buses are independent high speed SCSI interfaces.

5. A multifunction disk chassis for connecting with a plurality of hard disk drives comprising:

a first bus;

a second bus; and a plurality of edge connector pairs for connecting to said buses;

wherein each edge connector pair consists of a first edge connector connected to only said first bus and a second edge connector connected to only said second bus; and wherein each of said hard disk drives is connected to the first or second edge connector of an edge connector pair depending on an orientation of the drive at insertion.

6. The multi function disk chassis as set forth in claim 5, wherein said first and second buses are independent high speed SCSI interfaces.

7. A method of connecting a plurality of hard disk drives to a multi function disk chassis comprising the steps of:

providing an first bus;

providing a second bus;

providing a plurality of edge connector pairs wherein each edge connector pair consists of a first edge connector connected to only said first bus and a second edge connector connected to only said second bus; and connecting each of said hard disk drives to the first or second edge connectors of an edge connector pair depending on the orientation of the drive at insertion.

8. The method of connecting a plurality of hard disk drives to a multi function disk chassis as set forth in claim 7, wherein said first and second buses are independent high speed SCSI interfaces.

* * * * *